Aug. 18, 1959 — V. A. NILES — 2,899,769
ROD AND REEL HOLDER
Filed Dec. 12, 1957 — 2 Sheets-Sheet 1

Vergil A. Niles,
INVENTOR.

BY Loyal J. Miller
ATTORNEY

Aug. 18, 1959

V. A. NILES 2,899,769

ROD AND REEL HOLDER

Filed Dec. 12, 1957

Vergil A. Niles,
INVENTOR.

BY Loyal J. Miller
ATTORNEY

United States Patent Office 2,899,769
Patented Aug. 18, 1959

2,899,769

ROD AND REEL HOLDER

Vergil A. Niles, Yukon, Okla.

Application December 12, 1957, Serial No. 702,321

2 Claims. (Cl. 43—21.2)

The present invention relates to fishing apparatus and more particularly to a device for holding a fishing rod and reel.

The prior art reveals a number of fishing rod and reel holders for supporting a rod on the side of a boat or on the earth adjacent a body of water. However, each of the devices disclosed in the prior art grasps the fishing rod or reel, or the handle portion of the rod is threaded or inserted into a socket and support from which it can not be quickly removed. It is often desirable, when a fish bites, for the fisherman to quickly grasp the rod and set the fish hook in the mouth of the fish but this can not be easily done when using one of the above mentioned fishing rod holders.

It is, therefore, the principal object of the present invention to provide a fishing rod holder which will release the fishing rod the instant it is grasped by the fisherman.

Another important object of the present invention is to provide a fishing rod and reel holder for selectively supporting the rod adjacent the bank, on the side of a boat or on a fishing dock rail.

A further object is to provide a device of this class which may be quickly and easily assembled or disassembled.

Still another object is to provide a device of this character which is relatively small and may easily be carried in a pocket of a fisherman's clothing.

Yet another object is to provide a device of this class which is simple in construction, comprising a relative few parts, and which may, therefore, be manufactured and sold at a relatively low cost.

An additional object is to provide a fishing rod holder which is secured to the rod through the reel clamp screw hole or aperture, which point is substantially at the center of gravity of the fishing rod, thus, supporting the rod and reel in a substantially balanced position.

The present invention accomplishes these and other objects by providing a centrally bored mounting member which is threadly secured vertically at one end to a support. The wall of the upper end portion of the mounting member is flanged outwardly to form an inverted conical shaped socket. A screw is inserted into a transverse aperture of the conventional fishing rod adjacent the handle thereof and threadedly engaged with the reel clamp. The head of said screw is substantially conical in shape and projects laterally of the fishing rod and is adapted to be snugly received pivotally by the upwardly open socket in the mounting member.

Other objects will be apparent from the following description when taken in conjunction with the accompanying two sheets of drawings, wherein.

Figure 1:
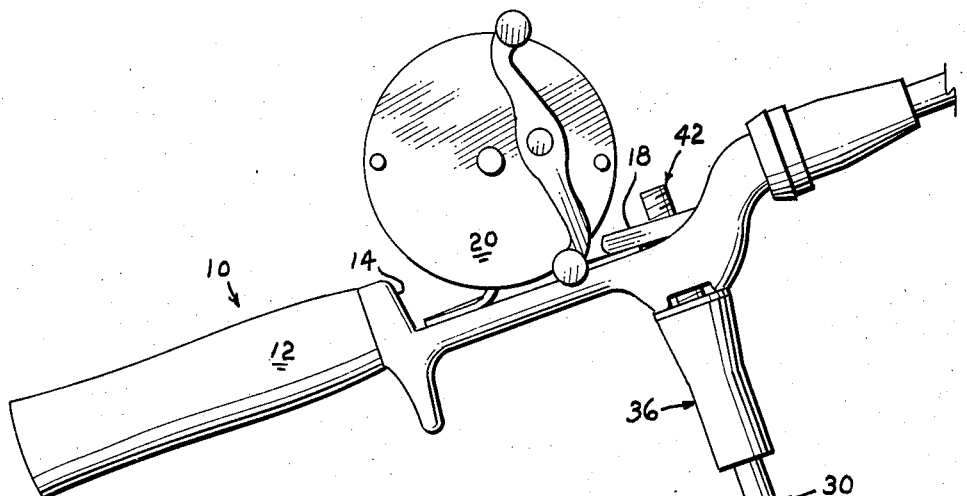
Figure 1 is a fragment elevational view of a conventional rod and reel illustrating the device in an operative position, a fragment of the earth being shown in cross-section.
Figure 2:
Figure 2 is a fragmentary cross-sectional view illustrating the manner of connecting the device to a fishing rod.
Figure 2:
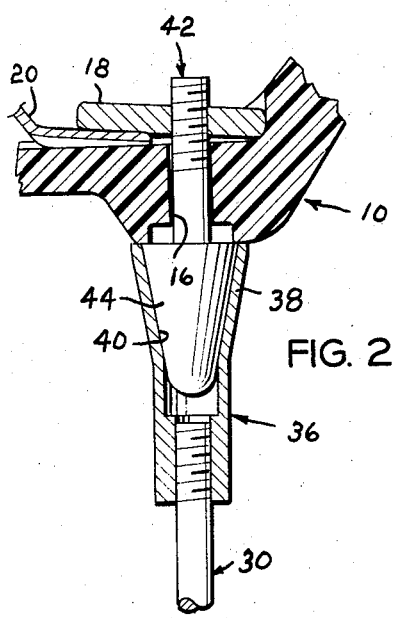
Figure 3:
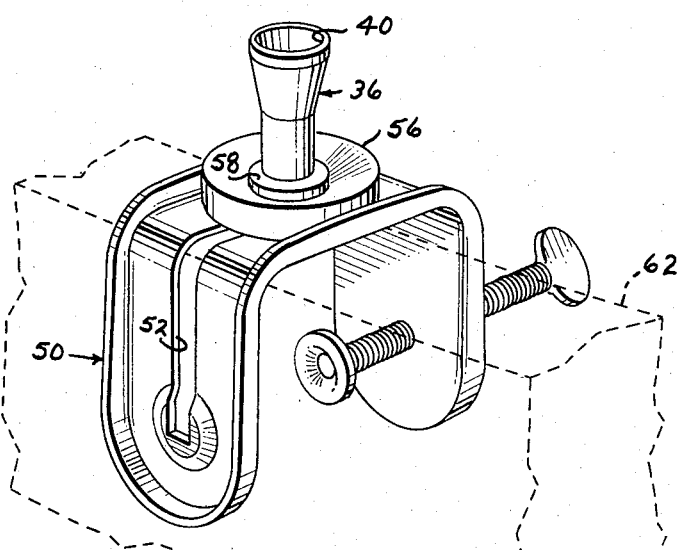
Figure 4:
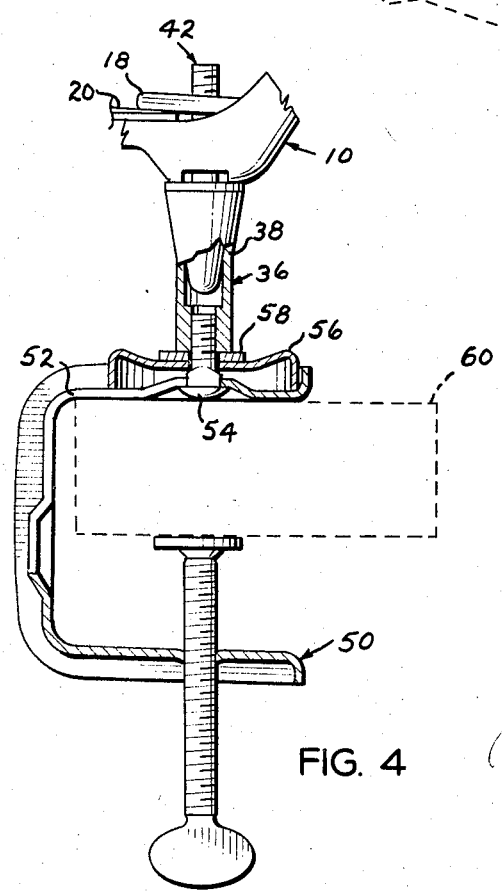

Figure 3 is a perspective view of a conventional C-clamp mounted on the side of a boat and illustrating the manner of securing the mounting member to the clamp, a fragment of the boat side being shown by dotted lines; and, Figure 4 is a fragmentary vertical cross-sectional view, partly in elevation, illustrating the manner of supporting a fishing rod on a C-clamp connected to a fishing dock rail, an end view of the rail being shown in dotted lines.

Like characters of reference designate like parts in those figures of the drawings in which they occur.

In the drawings:

The reference numeral 10 indicates, as a whole, a conventional fishing rod having a handle 12 and a reel receiving recess 14 adjacent the handle. The rod is provided with a transverse aperture 16 at the forward portion of the reel recess 14 for receiving a conventional screw, not shown, therein which is threadedly engaged with a clamp plate 18 to grip the base member of a reel 20 and hold the latter in operative position within the recess. It is with such a fishing rod and reel that the present invention is designed to be used.

In carrying out the invention an elongated rod-like element or standard 30 is provided at one extremity with a tapered or pointed end portion 32 to form a spike-like support which is adaptable for insertion into the surface of the earth 34. The opposite or upper end of the spike element 30 is externally threaded.

A mounting member 36, substantially cylindrical in general configuration, is centrally bored and internally threaded at one end for engagement with the threaded end of the spike 30. The bore in the end portion of the mounting member 36 opposite the threaded end is circumferentially enlarged to provide a relatively thin wall 38 which is belled or flared outwardly from a point intermediate the ends of the member to form an upwardly open substantially inverted conical socket 40.

The conventional screw, not shown, is removed from the fishing rod aperture 16 and a mandrel-screw 42 is inserted therein. The threaded end of the screw 42 is adapted to engage the clamp 18 and secure the reel 20 in place. The head of the screw 42 is axially elongated and tapered outwardly to form a substantially conical or mandrel-like head 44. The screw head 44 is formed to be cooperatingly received within the socket 40. Thus the fishing rod and reel are supported in pivotal relation with respect to the mounting member 36. The degree of taper used in forming the wall of the socket 40 and the mandrel-like head 44 of the screw is not critical but is preferably a taper of relatively small angle formed by flaring the free end wall not more than twice its original diameter so that the head 44 cannot be displaced from within the socket by a lateral force applied to the fishing rod 10 but which will permit the removal of the head 44 from the socket by an upward movement of the fishing rod. Thus, it may be seen that the device will support a fishing rod and reel adjacent a body of water even when the spike 30 is inserted vertically into the ground.

The device is equally adaptable for supporting a fishing rod and reel on the side of a boat or on the rail of a fishing dock. This is preferably accomplished by providing a C-clamp 50 to which the mounting member 36 is connected. The preferred C-clamp 50 is provided with a slotted body, as at 52, for receiving a conventional screw or carriage bolt 54. An adapter or flanged washer 56 and a flat washer 58 are placed on the screw 54 and the mounting member 36 is then threadedly engaged with the screw 54 in the manner illustrated in Fig. 4. Fig. 4 illustrates the C-clamp 50 as being connected to a horizontally disposed rail 60 adjacent a fishing dock. When it is desired to support the fishing rod 10 on the side of a boat or the like, the mounting member and connecting screw 54 is moved along the clamp slot 52 to the position shown by Fig. 3 and the clamp 50 is engaged over the upwardly disposed edge portion 62 of the boat.

Thus, it may be seen that a mounting member 36 has been provided which is adaptable for being supported vertically by a variety of means and which will removably receive a mandrel-headed screw, connected to a fishing rod, for supporting the fishing rod substantially horizontally.

Obviously the invention is susceptible to some change or alteration without defeating its practicability, and I therefore do not wish to be confined to the preferred embodiment shown in the drawings and described herein, further than I am limited by the scope of the appended claims.

I claim:

1. A holder for a fishing rod formed with a transversely extending aperture adjacent the handle thereof, comprising: a cylindrical standard terminating at one end in a pointed extremity adapted for insertion into the ground, the remaining end portion of said standard being threaded; a centrally bored mounting member threadedly carried axially by said standard, the wall of the upper end portion of said mounting member being flared outwardly medially its ends substantially twice its original diameter to form an upwardly open inverted conical socket; and a screw secured to said fishing rod through the aperture, said screw having a substantially conical shaped head projecting laterally of said fishing rod a distance substantially equal to the length of the conical socket and adapted to be removably received pivotally and completely within the socket in said mounting member.

2. In a fishing rod and reel holder, the combination with a fishing rod formed with a transversely extending aperture adjacent the handle thereof and a clamp member engageable with a reel for securing the reel to the rod and a C-clamp adapted for engagement with a rail or the like, of: a centrally bored mounting member having one end threaded internally; a screw carried vertically by said C-clamp for threadedly receiving said mounting member, the wall of the end portion of said mounting member opposite the threaded end being flared outwardly medially its ends substantially twice the diameter of the threaded end to form an inverted conical socket; and a mandrel screw extended through the aperture in said reel clamp member, said mandrel screw having an elongated substantially conical shaped head projecting laterally of said fishing rod a distance substantially equal to the depth of the conical socket and removably received pivotally and completely within the socket in said mounting member.

References Cited in the file of this patent

UNITED STATES PATENTS

| | | |
|---|---|---|
| 1,760,592 | Gift | May 27, 1930 |
| 2,311,823 | Gaskill | Feb. 23, 1943 |
| 2,459,549 | Smith | Jan. 18, 1949 |
| 2,519,851 | Reynolds | Aug. 22, 1950 |
| 2,581,671 | Katter | Jan. 8, 1952 |
| 2,596,247 | Kacsor | May 13, 1952 |
| 2,693,660 | Nebergall et al. | Nov. 9, 1954 |
| 2,698,725 | Triplett | Jan. 4, 1955 |

FOREIGN PATENTS

| | | |
|---|---|---|
| 510,296 | Canada | Feb. 22, 1955 |